Patented Apr. 21, 1931

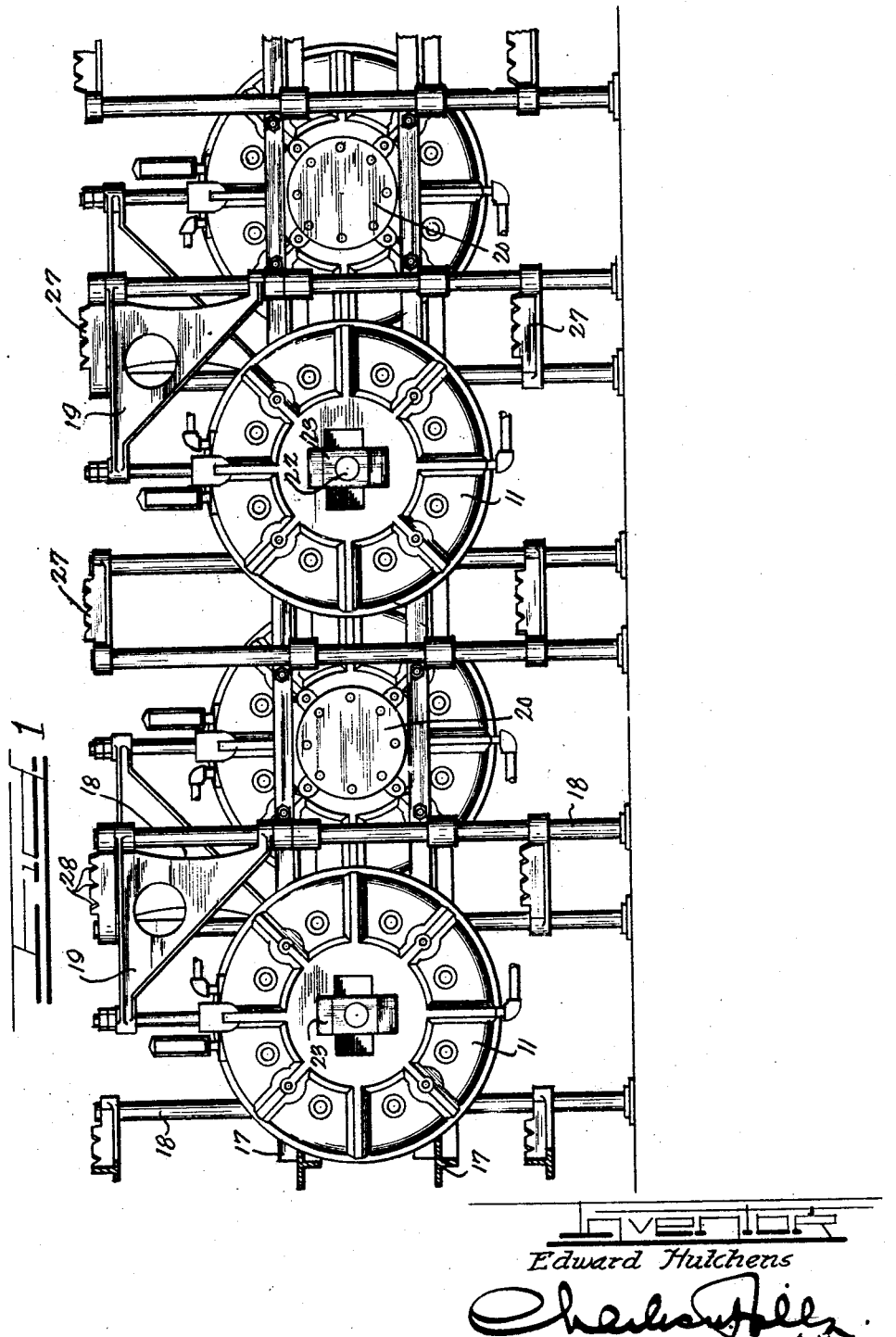

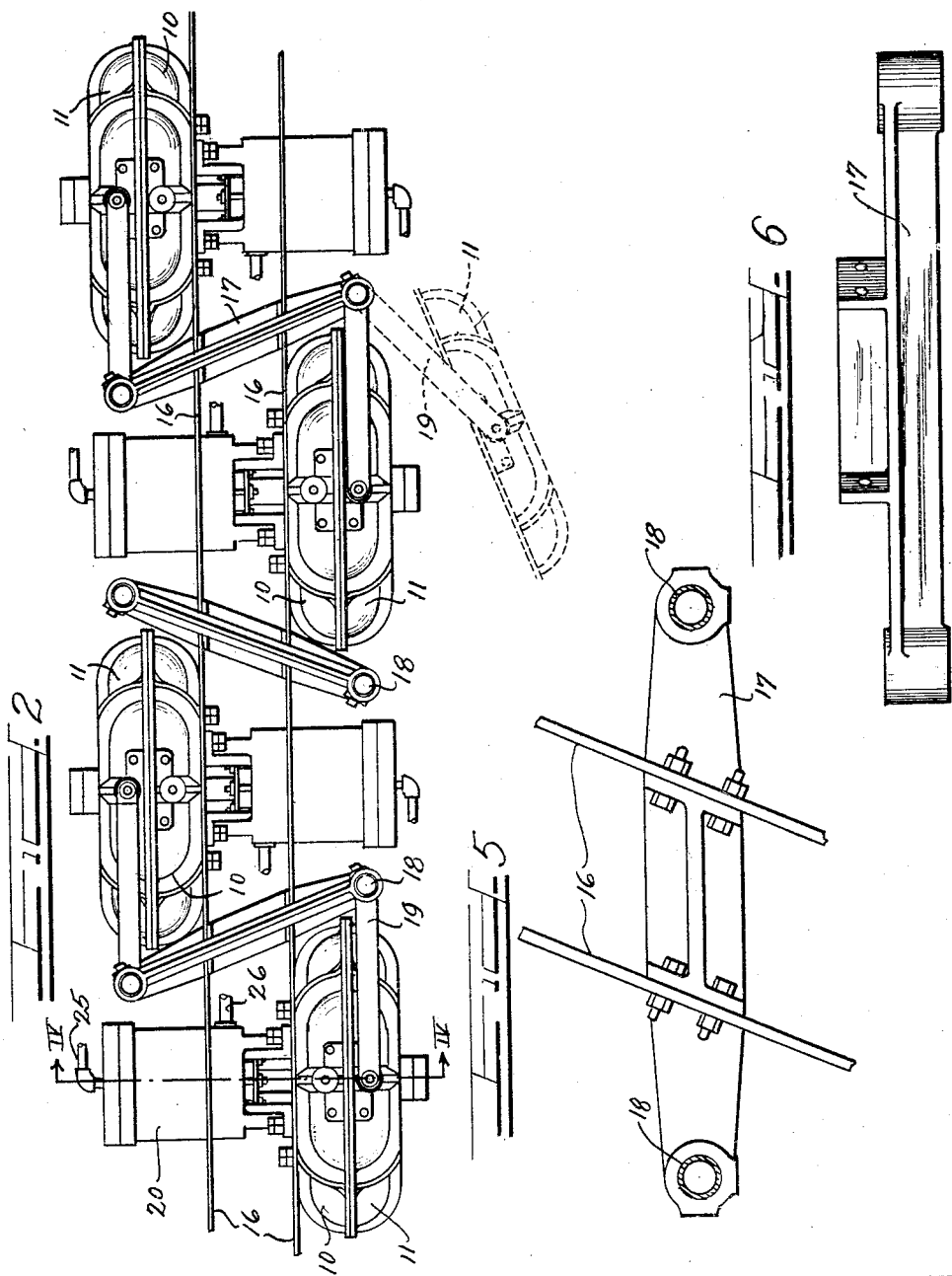

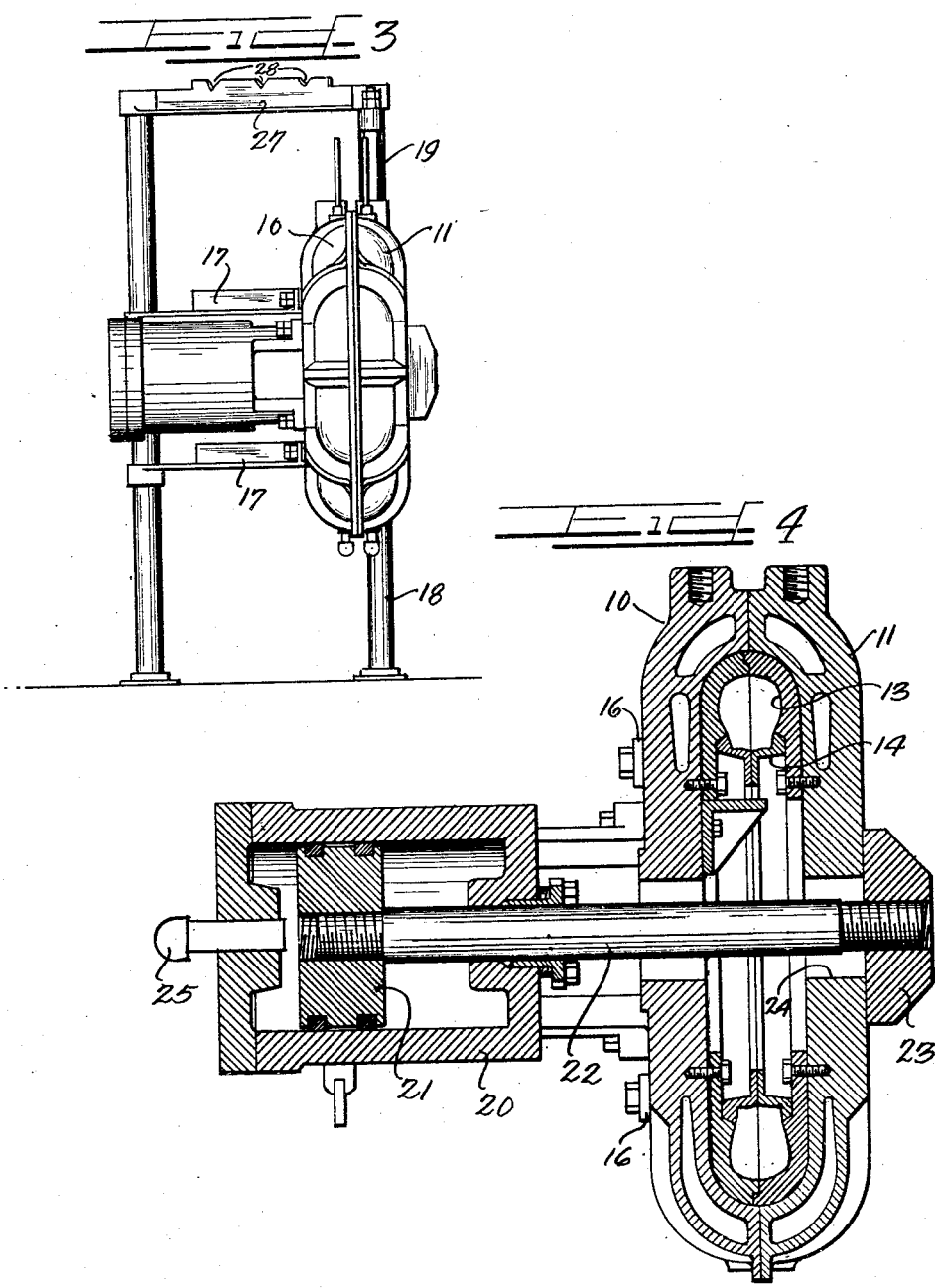

1,801,555

UNITED STATES PATENT OFFICE

EDWARD HUTCHENS, OF MILWAUKEE, WISCONSIN, ASSIGNOR TO UTILITY MANUFACTURING CO., OF CUDAHY, WISCONSIN, A CORPORATION OF WISCONSIN

FLUID LOCK FOR VULCANIZERS

Application filed July 29, 1925. Serial No. 46,933.

This invention relates to vertical or horizontal individual tire tube vulcanizing molds.

It is an object of this invention to provide a split mold one half of which is pivotally supported from a bracket in such a way as to permit the initial opening and final closing movements thereof to be in a direction substantially parallel to the stationary half of the mold whereby pinching of the tire carcass adjacent the hinged side of the mold is avoided.

It is another object of this invention to provide readily disengageable fluid actuated means for clamping the mold halves together during the vulcanizing operation.

It is also an object of this invention to provide a battery of individual tire or tube molds so arranged that it will be unnecessary to cool each mold before removing the completed tire and then reheating the mold after the insertion of another tire carcass whereby substantially continuous production may be maintained by progressive removal and replacement of tire carcasses along the length of the battery of molds.

Other and further important objects of this invention will be apparent from the disclosures in the specification and the accompanying drawings.

This invention (in a preferred form) is illustrated in the drawings and hereinafter more fully described.

On the drawings:

Figure 1 is an elevation of a battery of individual tire vulcanizing molds embodying the preferred form of the invention.

Figure 2 is a top plan view thereof.

Figure 3 is an end view corresponding to Figures 1 and 2.

Figure 4 is a section on the line IV—IV of Figure 2.

Figure 5 is a top view of one supporting brace assembled in position.

Figure 6 is a side view of one brace alone.

As shown on the drawings:

The vulcanizers shown are of the individual vertical and horizontal types comprising cored casings 10 and 11, one of which is hinged to swing away from the other to permit insertion of the articles to be vulcanized. These casings are purposely made large enough to receive varying sizes of tire or tube molds 13 which are bolted in place and part on the center line of the casings. Separate tire bead forming rings 14 are shown, these rings being assembled with the tire carcass and air bag as a separate unit and then inserted in the molds. Such a procedure permits the preparation of a large number of tires for vulcanization and the rapid removing and replacing of tires in the molds, so that cooling of the molds between the vulcanizing operation is dispensed with, thus materially reducing the time required and also saving the cooling water and steam otherwise required to cool and reheat the molds, respectively.

The two halves 10 and 11 of the outer casing are identical in form to simplify manufacturing conditions. The rear half 10 is rigidly supported by parallel bars 16 which in turn are supported by braces 17 mounted on standards 18, two sets of bars 16 being used to support a series of casings alternately disposed, as shown in the figures, to conserve space. With this arrangement one gang of workmen will progress along the line filling and emptying the casings in order. The front halves 11 of the casings are suspended from swinging brackets or jibs 19 pivoted on alternate standards 18, the casing half 11 being pivoted in the bracket in order that during the initial outward movement thereof it may be maintained substantially parallel to the fixed casing 10.

A fluid cylinder 20 is bolted on the back of the fixed casing 10 and a piston 21 and piston rod 22 are reciprocable therein, the rod 22 extending through the center of both casing halves and terminating in a nut 23 rotatable thereon and so shaped as to pass through the aperture 24 in the casing 11 when turned into a horizontal position while bearing on the casing when turned into a vertical position as shown in the drawings. Fluid connections for the cylinder are shown at 25 and 26, in Figure 2.

In proportioning the fluid cylinder it is advantageous to provide a piston area larger than the area of the air or water bag used in the tire, so that the same fluid and pressure can be used in both thus retaining a definite margin of closing pressure regardless of the pressure chosen for the air bag in the vulcanizing operation. As an example, the air bag in a 3½ inch tire when inflated to 250 lbs. per square inch would have a total side pressure of about 54,000 lbs. By designing the fluid cylinder to develop 67,000 lbs. total pull under the same pressure, the margin of closing pressure would be maintained 25% above the air bag side pressure regardless of variations in the fluid pressure used; with air, water or steam in both the air bag and fluid cylinder.

Top and bottom tie bars 27 are shown connecting pair of standards 18 and these tie bars may conveniently be notched as at 28 to align water, steam, and air piping for the molds.

In the operation of an individual mold the fluid piston and rod is advanced sufficiently to free the nut 23 which is then given a half turn to pass through the aperture 24 whereupon the casing front 11 may be pulled out and swung to one side as shown by the dotted lines in Figure 2. The tire carcass to be vulcanized has previously been assembled in the bead rings 14 and this assembly is inserted in the stationary half of the mold 13 and the casing front swung back into position thereon, the nut 23 being again engaged therewith and the fluid pressure applied to the piston to clamp the molds and casings together. It will be evident that either air or water may be used as the actuating fluid according to the exigencies of the installation.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A tire or tube vulcanizing mold comprising a split steam jacketed casing, interchangeable molds mounted therein, means pivotally supporting one half of the casing whereby it may be swung out of the way for the insertion of a tire or tube carcass, a fluid cylinder piston therein, a rod extending therefrom through the centers of the casing halves, and a nut on said rod adapted in one position to engage the swinging half of the casing whereby the piston may clamp the casing halves together.

2. A vulcanizing apparatus comprising steam jacketed casing halves, a pivoted bracket pivotally supporting one of said casing halves whereby the casing may be opened by an initial outward movement of the pivoted casing half in parallel relation to the fixed casing half, and fluid actuated means for pressing the casing halves together in closed position.

3. A centrally split vulcanizing casing one half of which is hingedly supported, a fluid cylinder secured to the other half, a piston therein, a rod connected to said piston and extending through the centers of both casing halves, and a releasable means adapted to engage the hinged half of the casing to clamp the molds together when the piston is actuated in one direction by fluid pressure.

4. A vulcanizer comprising a stationary section and a movable section, a cylinder arranged at the axis of the vulcanizer, a piston in the cylinder, a rotatable locking member operable by the piston, and an apertured member connected to the movable section, said apertured member being adapted to be engaged by the locking member in one of its angular positions to be actuated by the piston to clamp the movable section to the fixed section and adapted when the locking member is in another of its angular positions to permit opening of the movable section past the locking member.

5. A vulcanizer comprising cooperable mold parts one of which is movable away from another part to permit of the insertion of an article therein to be vulcanized, and means disposed substantially centrally of and extending thru said mold parts for locking them in cooperation, comprising a centrally disposed member adapted to engage said movable part and a support therefor.

6. A vulcanizer comprising cooperable mold parts one of which is movable away from another part to permit of the insertion of an article therein to be vulcanized, and means disposed substantially centrally of and extending thru said mold parts for locking them in cooperation, comprising a rotatable member disposed concentric with said mold parts and a supporting element therefor.

7. A vulcanizer comprising ring-like mold parts cooperable with each other to define an enclosed ring-like cavity one of which is movable away from the other to permit of the insertion of an article therein to be vulcanized, and means for clamping said mold parts in cooperation including a piston, a rod associated therewith and extending through the opening in the center of the ring-like mold parts, and a clamping head connected to said rod for engagement with said movable mold part.

8. A vulcanizer comprising ring-like mold parts cooperable with each other to define an enclosed ring-like cavity one of which is movable away from the other to permit of the insertion of an article therein to be vulcanized, and means for clamping said mold parts in cooperation including piston means and a rod associated therewith and extending through the opening in the center of said ring-like mold parts, said rod having means on an end thereof effective to clampingly engage said movable mold part when said piston means is actuated.

9. A vulcanizer comprising ring-like mold parts cooperable with each other to define an enclosed ring-like cavity one of which is movable away from the other to permit of the insertion of an article therein to be vulcanized, and means for clamping said mold parts in cooperation including piston means and a rod associated therewith and disposed substantially centrally of and extending through the opening in said ring-like mold parts for clamping cooperation with said movable part.

10. A vulcanizer comprising ring-like mold parts cooperable with each other to define an enclosed ring-like cavity one of which is movable away from the other to permit of the insertion of an article therein to be vulcanized, and means for clamping said mold parts in cooperation including piston means, a rod associated therewith and disposed substantially centrally of and extending through the opening in said ring-like mold parts and laterally extending arms connected to an end of said rod for clamping engagement with said movable mold member.

In testimony whereof I have hereunto subscribed my name.

EDWARD HUTCHENS.